Patented May 5, 1953

2,637,706

UNITED STATES PATENT OFFICE 2,637,706

ADHESIVES COMPRISING PHENOL-FORM-ALDEHYDE RESINS, CERTAIN POLYVINYL ACETAL RESINS AND RICINOLEATE ESTERS

Milton A. Bergstedt, Linden, and Robert H. Lamason, Bound Brook, N. J., assignors to Industrial Tape Corporation, a corporation of New Jersey No Drawing. Application July 14, 1950,
Serial No. 173,952

7 Claims. (Cl. 260—19)

This invention relates to the art of adhesives and adhesive films. More specifically it relates to adhesive compositions based on phenol formaldehyde condensation products and one or more of polyvinyl propional, polyvinyl butyral, polyvinyl pental and polyvinyl hexal.

The polyvinyl acetals named interact with the phenol formaldehyde condensation products to provide uniform compositions which are substantially more resistant to solvents and have better strength properties than either resin alone. The compositions may readily be applied from solution or as partially cured normally stable but heat-reactive solids, and fully cured on the surfaces that they are to bond at the application temperatures and pressures which provide temporary heat softening and good flow of the adhesive into the surface interstices followed by rapid heat cure and accordingly a satisfactory permanent bond.

However, the above-mentioned compositions have two important disadvantages:

1. The ultimate shear strength is not as high as is desirable for many industrial applications; and,
2. The compositions are slightly brittle and accordingly sometimes difficult to handle in solid form.

This invention, therefore, has the primary object of providing adhesive compositions of high ultimate shear strength. A more specific object is to provide an adhesive composition comprising at least one phenol formaldehyde condensation product and at least one of the polyvinyl propionals, the polyvinyl butyrals, the polyvinyl pentals and the polyvinyl hexals having increased ultimate shear strength, while at the same time preserving and utilizing all advantageous properties of similar compositions of the prior art. A further object is the provision of strong adhesive compositions that are flexible enough to permit ready handling. A still further object is the provision of strong, easily handled adhesive compositions that are economical, easy to prepare and require no expensive equipment either in their manufacture or their use. These objects as well as other important objects will become readily apparent to those skilled in the art from the following description of the invention.

The invention is based upon the surprising discovery that the ultimate strength of compositions comprising phenol formaldehyde and one or more of the polyvinyl propionals, the polyvinyl butyrals, the polyvinyl pentals and the polyvinyl hexals, is improved greatly and the flexibility and ease of handling enhanced if these compositions contain a total of from at least one quarter of one per cent but not more than seven and one half per cent by weight of one or more ricinoleate esters, based on the combined weight of the phenol formaldehyde condensation product and the polyvinyl acetal in the composition.

Best overall results and the highest ultimate shear strength are obtained if from one to five per cent ricinoleate ester is present in the composition. If substantially less than one quarter of a per cent ricinoleate ester is used, no significant increase in strength or flexibility is observed. If substantially less than one per cent ricinoleate ester is used, no significant improvement in flexibility and handling is observed. If substantially more than five per cent ricinoleate ester is used the composition is too weak in shear strength for some uses. If substantially more than seven and one half per cent ricinoleate ester is used the composition is too weak for many important industrial uses.

In those aspects of the invention where it is desired to apply a composition comprising phenol formaldehyde condensation product and one of the above-named polyvinyl acetals and to cure the composition after application, the preferred phenol formaldehyde condensation product will be an alkali catalyzed alcohol soluble phenol formaldehyde resin. In preferred compositions of this type the ratio of formaldehyde to phenol will be at least one to one and not more than three to one. Best results will be obtained with ratios of formaldehyde to phenol of from 1.1 to one to two to one. Where cure after application is not desired, other phenol formaldehyde resin may be used. The type of polyvinyl acetal is important. Polyvinyl formal and polyvinyl acetal show no significant improvements when compounded in accordance with this invention. No significant improvements are noted in compositions using the highest acetals. Best improvement is noted in compositions comprising polyvinyl propionals, the polyvinyl butyrals, the polyvinyl pentals and the polyvinyl hexals. Incidentally, the term polyvinyl acetal is used in this specific generic meaning to include the group rather than polyvinyl acetal itself, which is unsuitable for purposes of this invention. Whenever mention is made herein of any type of acetal as suitable, its isomers are similarly suitable.

Any ricinoleate ester may be used. Castor oil is highly satisfactory. Among other ricinoleate esters that are valuable in the execution of this invention are: methyl ricinoleate, ethyl ricinoleate, butyl ricinoleate, methyl acetyl ricinoleate, ethyl acetyl ricinoleate, butyl acetyl ricinoleate, glyceryl tri-aceto ricinoleate, commercial castor oil, purified castor oil and the other commercial ricinoleate esters. The more complex esters may also be used e. g. monomethyl ethylene glycol ricinoleate and acetylated monomethyl ethylene glycol ricinoleate.

The preferred compositions of the invention are based on ratios of from forty to seventy-five parts of one or more of the above-mentioned polyvinyl acetals compounded with from sixty to twenty-five parts phenol formaldehyde condensation product. The satisfactory ratios of ricinoleate ester added to one hundred parts of any of the above-mentioned compositions were described earlier in this specification.

To illustrate representative embodiments of the invention by way of example only but not to limit the scope of the invention in any way illustrative embodiments are furnished below:

*Example*

Parts by weight
Polyvinyl butyral (7% hydroxyl) (2.6 times greater when calculated as vinyl alcohol) intrinsic viscosity 0.81–1.16 in cyclohexanone at 20° C. (specific gravity 1.03) ____ 63
Alcohol soluble curing phenol formaldehyde resin, alkali condensed (ratio of phenol to formaldehyde 1.1 to 1.5) _____ 37
Commercial castor oil_____ 1

A miscible solution of the two resins is prepared. The phenol formaldehyde condensation product is dissolved in alcohol and the polyvinyl butyral in a mixture of alcohol and acetone. Solutions comprising approximately forty per cent solids by weight may be used, although all other solutions of sufficient fluidity to permit ready mixing are satisfactory. The castor oil may be mixed in slowly with the two solutions, i. e., using a conventional wall stirrer or any internal mixer.

The adhesive may be applied as the solution made above or alternatively the adhesive may be cast into a conventional film, for instance, of one mil thickness, using conventional film casting equipment and drying for from three to ten minutes at approximately one hundred fifty degrees Fahrenheit, and the adhesive may be used in the form of the dry heat-reactive but otherwise stable film. Alternatively the film may be cast onto a fibrous or non-fibrous surface e. g. rope paper or a polyvinyl butyral film and used in that form. The adhesives are normally cured at from two hundred degrees Fahrenheit to four hundred degrees Fahrenheit for several minutes to several hours after application.

To illustrate the invention even better there follows a table showing examples using various proportions of the ingredients listed.

*Table*

| | Examples | | | | | |
|---|---|---|---|---|---|---|
| | 2 | 3 | 4 | 5 | 6 | 7 |
| Phenol Formaldehyde Condensation Product as Described on Page 4 parts by weight__ | 33 | 40 | 40 | 40 | 37 | 50 |
| Polyvinyl Propional_____do____ | 67 | | | | | |
| Polyvinyl Butyral_____do____ | | 60 | | | 63 | 50 |
| Polyvinyl Pental_____do____ | | | 60 | | | |
| Polyvinyl Hexal_____do____ | | | | 60 | | |
| Castor Oil, Refined_____do____ | 4 | | | | 2 | |
| Ethyl Ricinoleate_____do____ | | 2 | | | | |
| Butyl Acetyl Ricinoleate_____do____ | | | 4 | | | 3 |
| Glyceryl Tri-Aceto Ricinoleate_do____ | | | | 6 | | |
| Triethylene Glycol Di-2-Ethyl Hexoate_____parts by weight__ | | | | | 2 | |
| Methylene Blue_____do____ | | 0.2 | | | | |

In addition to the principal ingredients there may be added to the composition conventional dyes, catalysts, fillers and plasticizers without substantial effect on the invention. Several aldehyde resins, acetals and/or ricinoleates may be used instead of a single one. If an amount of conventional plasticizer such as triethylene glycol di-2-ethyl hexoate or triethylene glycol di-2-ethyl butyrate equal to the amount of castor oil is added, the shear strength is not changed substantially over the shear strength using only the original amount of castor oil. For this reason, the addition of plasticizer other than castor oil is often desirable where increased flexibility and the advantages of castor oil are both of importance. Example 6 of the table illustrates such a composition. Other similar compositions may be based on the many other conventional plasticizers for other phenol formaldehyde condensation products and polyvinyl butyrals.

It should be noted that in most compositions of the invention a maximum shear strength is reached using one part ricinoleate ester per one hundred parts of resin regardless of the other ingredients present. A substantial increase in shear strength of the compositions free of castor oil can be noted when one per cent castor oil is used and compositions comprising as much as eight per cent castor oil still show some improvement over the castor oil-free compositions. For instance, using thirty-seven parts of phenol aldehyde condensation product and sixty-three parts of polyvinyl butyral, addition of one-quarter of one per cent of castor oil produces an improvement in shear strength of thirty-five per cent, addition of one per cent produces an improvement of one hundred and ten per cent, while addition of five per cent produces an improvement of only seventy per cent and addition of larger amounts of castor oil steadily lessens the improvement until virtually none may be observed after addition of approximately ten per cent.

The invention provides a simple and convenient way of increasing flexibility and shear strength of adhesives based on certain polyvinyl acetals and phenol formaldehyde condensation products. The products of the invention are useful for many applications, wherever strength in adhesives is desired, for instance, in the construction industry, in lamination, in the electrical industry and in many other fields.

While the invention has been described in a few of its preferred forms this description is not intended to be by way of limitation but merely by way of illustration and the invention includes many equivalents obvious to those skilled in the art reading this specification.

The claims are:

1. An adhesive composition comprising a synthetic resin base including from about twenty-five to about sixty parts by weight of phenol formaldehyde condensation product and from about forty to about seventy-five parts by weight of at least one polyvinyl acetal selected from the group consisting of the polyvinyl propionals, the polyvinyl butyrals, the polyvinyl pentals and the polyvinyl hexals, and from about one-quarter of one per cent to about seven and one-half per cent by weight, based on the total of said condensation product and said polyvinyl acetal, of at least one ricinoleate ester.

2. An adhesive composition comprising a synthetic resin base including from about twenty-five to about sixty parts by weight of phenol formaldehyde condensation product and from about forty to about seventy-five parts by weight of at least one polyvinyl acetal selected from the group consisting of the polyvinyl propionals, the polyvinyl butyrals, the polyvinyl pentals and the polyvinyl hexals, and from about one per cent to about five per cent by weight, based on the total of said condensation product and said polyvinyl acetal, of at least one ricinoleate ester.

3. An adhesive composition comprising a synthetic resin base including from about twenty-five to about sixty parts by weight of phenol formaldehyde condensation product and from about forty to about seventy-five parts by weight of at least one polyvinyl acetal selected from the group consisting of the polyvinyl propionals, the polyvinyl butyrals, the polyvinyl pentals and the polyvinyl hexals, and from about one-quarter of one per cent to about seven and one-half per cent by weight, based on the total of said condensation product and said polyvinyl acetal, of castor oil.

4. An adhesive composition comprising a synthetic resin base including from about twenty-five to about sixty parts by weight of phenol formaldehyde condensation product and from about forty to about seventy-five parts by weight of polyvinyl butyral and from about one-quarter of one per cent to about seven and one-half per cent by weight, based on the total of said condensation product and said polyvinyl butyral, of at least one ricinoleate ester.

5. An adhesive composition comprising a synthetic resin base including from about twenty-five to about sixty parts by weight of phenol formaldehyde condensation product and from about forty to about seventy-five parts by weight of polyvinyl pental and from about one-quarter of one per cent to about seven and one-half per cent by weight, based on the total of said condensation product and said polyvinyl pental, of at least one ricinoleate ester.

6. An adhesive composition comprising a synthetic resin base including from about twenty-five to about sixty parts by weight of alcohol soluble alkali condensed phenol formaldehyde condensation product, having a formaldehyde to phenol ratio of from about 1.1 to one to about two to one, and from about forty to about seventy-five parts by weight of at least one polyvinyl acetal selected from the group consisting of the polyvinyl propionals, the polyvinyl butyrals, the polyvinyl pentals and the polyvinyl hexals and from about one-quarter of one per cent to about seven and one-half per cent by weight, based on the total of said condensation product and said polyvinyl acetal, of at least one ricinoleate ester.

7. An adhesive composition comprising a synthetic resin base including from about twenty-five to about sixty parts by weight of alcohol soluble alkali condensed phenol formaldehyde condensation product, having a formaldehyde to phenol ratio of from about 1.1 to one to about two to one, and from about forty to about seventy-five parts by weight of polyvinyl butyral and from about one per cent to about five per cent by weight, based on the total of said condensation product and said polyvinyl butyral, of castor oil.

MILTON A. BERGSTEDT.
ROBERT H. LAMASON.

References Cited in the file of this patent

UNITED STATES PATENTS

| Number | Name | Date |
| --- | --- | --- |
| 2,396,098 | Haas | Mar. 5, 1946 |
| 2,433,098 | Debacher | Dec. 23, 1947 |
| 2,442,018 | Quarles | May 25, 1948 |

OTHER REFERENCES

Baekeland, J. Ind. and Eng. Chem., March 1909, page 155.